US 6,687,574 B2

(12) United States Patent
Pietrowicz et al.

(10) Patent No.: US 6,687,574 B2
(45) Date of Patent: Feb. 3, 2004

(54) SYSTEM AND METHOD FOR SURVEYING UTILITY OUTAGES

(75) Inventors: Stanley Pietrowicz, Freehold, NJ (US); Frederick Link, Red Bank, NJ (US); Douglas Allport, Kanata (CA); Hamilton Rothrock, Holmdel, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 180 days.

(21) Appl. No.: 09/999,041

(22) Filed: Nov. 1, 2001

(65) Prior Publication Data
US 2003/0083786 A1 May 1, 2003

(51) Int. Cl.[7] .......................... G06F 19/00; G01R 31/00
(52) U.S. Cl. .................... 700/293; 700/79; 700/292; 702/59
(58) Field of Search ....................... 700/79, 80, 292, 700/293; 702/59

(56) References Cited

U.S. PATENT DOCUMENTS

| 5,189,694 | A | | 2/1993 | Garland | 379/106 |
|---|---|---|---|---|---|
| 5,394,461 | A | | 2/1995 | Garland | 379/106 |
| 5,568,399 | A | * | 10/1996 | Sumic | 700/293 |
| 5,841,845 | A | * | 11/1998 | Garland et al. | 379/106.01 |
| 6,058,355 | A | * | 5/2000 | Ahmed et al. | 702/62 |
| 6,219,409 | B1 | * | 4/2001 | Smith et al. | 379/106.09 |
| 6,233,330 | B1 | * | 5/2001 | McClure et al. | 379/212.01 |
| 6,259,972 | B1 | * | 7/2001 | Sumic et al. | 700/286 |
| 6,271,759 | B1 | * | 8/2001 | Weinbach et al. | 340/635 |
| 6,313,752 | B1 | * | 11/2001 | Corrigan et al. | 340/657 |
| 6,360,178 | B1 | * | 3/2002 | Parsons et al. | 702/65 |
| 6,477,475 | B1 | * | 11/2002 | Takaoka et al. | 702/59 |
| 6,480,748 | B1 | * | 11/2002 | Gerszberg et al. | 700/21 |
| 6,509,841 | B1 | * | 1/2003 | Colton et al. | 340/870.11 |
| 2003/0078698 | A1 | * | 4/2003 | Bradford | 700/286 |
| 2003/0081735 | A1 | * | 5/2003 | Emory et al. | 379/1.01 |

OTHER PUBLICATIONS

Telcordia Technologies Generic Requirements, "LSSGR: Voiceband Data Transmission Interface," GR–30–CORE, Issue 2, Dec. 1998.

Telcordia Technologies Generic Requirements, "LSSGR: CLASS Feature: Calling Number Delivery," GR–31–CORE, Issue 1, Jun. 2000.

(List continued on next page.)

Primary Examiner—Leo Picard
Assistant Examiner—Elliott L Frank
(74) Attorney, Agent, or Firm—Glen Farbanish; Joseph Giordano

(57) ABSTRACT

Utility failures are automatically detected and potential causes for these failures are automatically located and identified without having to physically search a utility provider's network. Detection systems capable of monitoring utility status are located at each, or a subset, of the customer premises serviced by a utility provider. A monitoring system, capable of correlating the geographical location of the detection systems with the geographical location of the equipment that comprises the utility provider's network, is located at a utility provider and interconnects with the detection systems through a communications network. The monitoring system queries the detection systems to determine utility status and to subsequently locate an outage and deduce a possible cause for the outage. Detection systems can also be configured to automatically contact the monitoring system to report utility status. The monitoring system is also capable of sending customer based information messages to the detection systems.

18 Claims, 4 Drawing Sheets

OTHER PUBLICATIONS

Telcordia Technologies Generic Requirements, "LSSGR: CLASS Feature: Calling Name Delivery Generic Requirements," GR–1188–CORE, Issue 2, Dec. 2000.

Telcordia Technologies Generic Requirements, "LSSGR: CLASS Feature: Calling Identity Delivery on Call Waiting," GR–575–CORE, Issue 1, Jun. 2000.

Telcordia Technologies Generic Requirements, "LSSGR: Visual Message Waiting Indicator Generic Requirements," GR–1401–CORE, Issue 1, Jun. 2000.

Telcordia Technologies Special Report, "Testing Guidelines for Analog Type 1, 2, and 3 CPE as Described in SR–INS–002726," SR–3004, Issue 2, Jan. 1995.

* cited by examiner

SYSTEM AND METHOD FOR SURVEYING UTILITY OUTAGES

BACKGROUND OF OUR INVENTION

1. Field of the Invention

Our invention relates generally to detecting and locating utility outages. More particularly, our invention relates to automatically detecting a utility outage within a utility provider's network and identifying and locating potential causes for the outage.

2. Description of the Background

In today's environment, a utility provider is not able to quickly and easily detect and locate service outages. For example, storms can cause downed utility lines, affecting electrical and telephony service to one or more customers on a street, in a neighborhood, or in a town. In other cases, an outage is specific to a particular customer, related to internal premises wiring. At times, the utility provider is able to detect the problem and at other times, the utility provider only learns of the outage once customers make service calls. Regardless of how the provider learns of the outage, it must still physically search for the exact location of the failure wasting both time and money. In addition, customers often do not know the status of an outage and either flood the provider's service department with calls or are left wondering when service will be restored.

SUMMARY OF OUR INVENTION

Accordingly, it is desirable to provide methods and apparatus that allow a utility provider to quickly detect failures prior to service calls being made and to automatically locate and identify potential causes for the failures without physically searching the entire network. Similarly, it is desirable to provide methods and apparatus that will automatically notify customers of the current status of an outage thereby improving customer satisfaction and reducing the number of service calls.

Under our invention, detection systems are located at each customer premises serviced by a utility provider, or at a subset of customer premises wherein the subset adequately represents the geographical region serviced by the utility provider. Similarly, a monitoring system is located at the utility provider. A communications network, for example the public switched telephone network, the CCS/SS7 network, or a packet network, interconnects the detection systems and the monitoring system. Each detection system comprises a monitoring device to detect the presence/absence of the given utility at the customer premises. The monitoring system comprises a geographical information system, which is a database that correlates the geographical location of the detection systems with the geographical location of the equipment that comprises the utility provider's network.

Under one embodiment of our invention, the monitoring system queries, in response to a reported outage for example, one or more detection systems via the communications network to determine utility status at each corresponding premises. In response, each queried detection system determines the current utility status at its premises and relays this information back to the monitoring system. In turn, the monitoring system uses the geographical information system and the reported utility status information to determine if an outage/failure has occurred and the possible location and causes for the outage. The monitoring system is also capable of sending messages to the detection systems in the form of audible alarms, lit LEDs, and LCD text messages. Such messages may be sent to inform customers as to the status of an outage.

Under a second embodiment of our invention, the monitoring system configures all or a subset of the detection systems to automatically contact the monitoring system to report utility status. This reporting can occur, for example, on a periodic basis, or when a detection system detects a utility outage. Similar to the first embodiment, the monitoring system can query additional detection systems upon learning of a reported outage to further locate the cause of the outage, and can send messages to the detection systems to report utility status.

DETAILED DESCRIPTION OF OUR INVENTION

Figure 1:
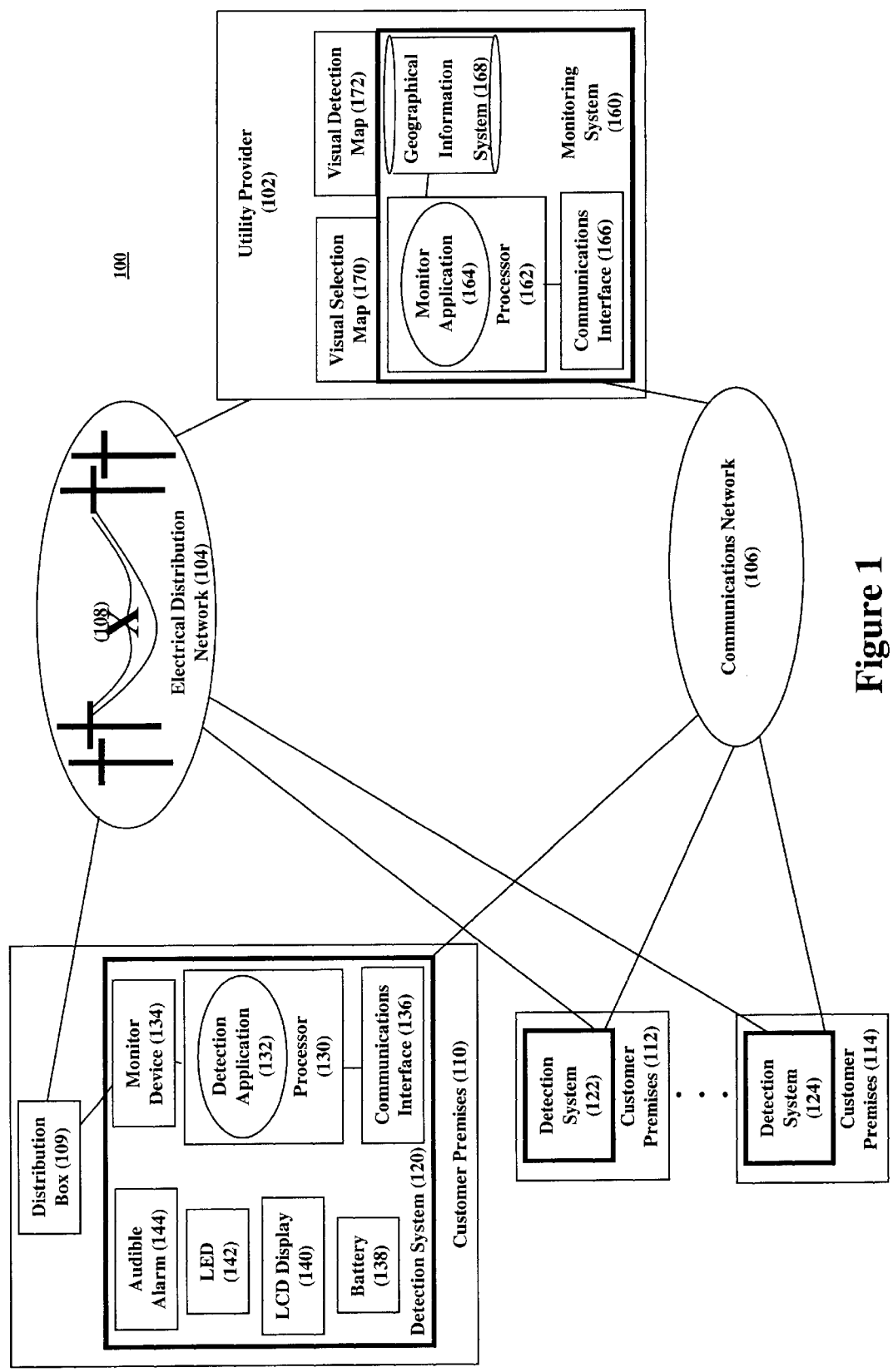
FIG. 1 is a simplified block diagram of one specific illustrative embodiment of our invention wherein detection systems monitor the utility service status at customer premises and report the status through a communications network to a monitoring system that detects potential network outages and determines the possible location and causes for these outages.

FIG. 1 shows an illustrative diagram of an outage detection system 100 of our invention. For illustrative purposes, the system is shown as detecting outages within an electric utility provider's network. However, our invention is also applicable to other utility providers, such as telephony and cable providers. As such, the system comprises exemplary utility provider 102 that provides electricity to a plurality of customers 110–114 through an electrical distribution network 104 comprising poles, lines, transformers, substations, etc. The objective of our invention is to assist the utility provider in detecting the presence/absence of power at one or more customer premises prior to service calls being made and to locate the cause of the power system failure, whether within the distribution network, such as failure 108, or within a customer's premises, without the provider having to physically search large portions of the network or customers' premises.

A detection system, 120–124, is located at each customer premises serviced by the utility provider, or at a subset of the customer premises wherein the subset adequately represents the various geographical regions serviced by the utility provider. The detection systems are either a standalone device or a subsystem embedded within another customer premise system. Detection system 120 is an exemplary detection system. The system comprises a monitor device 134, a communications network interface 136 for communicating over communications network 106, and a detection application 132 executing on processor 130. In the case of an electric utility provider as shown in FIG. 1, the monitor device 134 detects the presence/absence of AC power either directly through the premises' distribution box 109, or through an outlet. Similarly, in the case of a telephony service provider, the monitor device detects the presence/absence of telephony service, etc. (Note also that a detection system can comprise a plurality of monitor devices to monitor several utility services at the customer premises.) The detection application 132 interfaces with the monitor device to determine the utility status and to report this status to the utility provider via the communications network either automatically or in response to a query by the provider, as is further described below. The detection system is either powered solely from a battery 138, or via AC power, in which case the battery is used if power is lost (note that the battery is required for AC detection systems). The detection system 120 may also include an LCD display 140, an LED 142, and/or an audible alarm 144. These user interface elements allow the utility provider to communicate with the end customer to provide, for example, information regarding the status of an outage or to notify the customer when the provider is checking the service status.

In conjunction with the plurality of detection systems, 120–124, is a monitoring system 160 located at, for example, the utility provider 102. The monitoring system 160 comprises a monitoring application 164 executing on processor 162, a geographical information system 168, and a communications network interface 166 for communicating over communications network 106. The monitoring application 164 communicates with the detection systems via the communications network to determine the utility status at the customer premises. The geographical information system is a database that correlates the geographical location of the detection systems with the geographical location of the equipment comprising the utility provider's network. Specifically, all detection systems have a corresponding address on the communications network (e.g., an IP address, PSTN address, etc.), which the monitoring system stores in the geographical information system and correlates to the physical location of the premises at which a detection system is located. Similarly, the geographical information system maintains a list of the provider's network resources and each resource's physical location (as is typically maintained by a provider). As such, based on the utility status reported by the detection systems at each monitored customer premises, the monitoring application uses the geographical information system to locate the possible cause(s) of an outage by correlating the location of the network resources with the location of reported outages. In addition, the monitoring system may include a visual selection map 170 and a visual detection map 172 of the service providers network to assist users in selecting which detection systems to query and in locating potential outage causes, respectively.

Using the electric utility provider as a specific example as shown in FIG. 1, the monitoring application 164 communicates with the detection systems 120–124 through the communications network 106 and queries the systems for the corresponding premises' AC power status. The monitoring application is configurable such that a user can set the exact premises/systems to query and at what query rate. A user can use the visual selection map 170 to select the detection systems that should be monitored. As an example, a user can configure the monitoring system to query all detection systems on a periodic basis, to query certain systems based on the location of a storm, or to query certain systems relative to a reported customer outage. In response to a status query, a detection system determines the current status of AC power at the corresponding premises and relays this status back to the monitoring system. Advanced detection systems may constantly monitor the utility status, storing the date and time of the last outage(s), and report this additional information in response to a query. Similarly, AC detection systems can measure the power voltage level, detecting brownout conditions, etc. The monitor application uses the geographical information system 168 and the utility status received from the detection systems to determine if a network outage 108 has occurred, the location of the outage, and possible causes for the outage. The visual detection map 172 can display the outages and possible causes for the outages as a way to assist system users. Once an outage is detected, the monitoring system can automatically send a message to all detection systems of affected customers indicating, for example, that the utility company is aware of the outage and the expected restore time (this message can be displayed on LCD display 140).

In addition to querying the detection systems, a user of the monitoring system can also configure all, or a subset, of the detection systems to automatically contact the monitoring system to report a utility status. For example, the reporting can occur on a periodic basis regardless of the utility status, or can only occur upon the detection of an outage. A user of the monitoring system can choose and configure the systems that will automatically report status. Like above, the monitoring system can query additional systems upon learning of an outage, and can report outage information to a user through the visual detection map.

Reference will now be made to an exemplary communications protocol between the monitoring system and detection systems. This discussion is followed by a description of several communications networks over which the monitoring system and detection systems can communicate. It should be noted that the exact form of the communications protocol and communications network is not critical to our invention and that one skilled in the art could readily devise similar protocols and apply our invention to different networks.

Communications between the monitoring system and detection systems can be categorized as five general types of messages: a query message, a response message, a status message, a configuration message, and an alerting message. These messages are exemplary only and are described to show the type of information that can be conveyed between the monitoring system and detection systems to implement our invention. Additionally, as described below, not all messages are required to implement our invention.

The monitoring system originates the query message, which instructs a detection system to report its utility status through the response message. The query message comprises two primary parameters: the query type and the response method. Both parameters have definable values that can either be hard-coded within the monitoring application, configured by a user, or defined based on the type of communications network. The first parameter, query type, specifies whether the query is silent or is announced. With a silent query, the monitoring system instructs the detection system to provide no notification to the customer that a query is being conducted. With an announced query, the query message contains additional information that instructs the detection system to notify the customer that a query is being conducted. The notification can be made by sounding audible alarm 144, by lighting LED 142, and/or by displaying a message on LCD 140. The displayed message can be a predefined message stored within the detection system and triggered by a message code in the query message. The displayed message can also be a text message taken from the query message and may optionally include the time and date of the query and a callback number to allow customers to contact the utility. Similarly, the message may notify the customer of a utility related issue.

The second parameter, response method, specifies how the detection system should report the utility status, specifically, as a timed off-hook, as a tone response, or as a protocol message as is further described below.

The response message is generated by a detection system in response to a query from the monitoring system. As indicated above, the response can take one of three forms: a time off-hook, a tone response, or a protocol message. The timed off-hook and tone response methods are directed at communication network implementations that cannot support protocol messages, in particular, when the communications network is the public switched telephone network (PSTN) and the monitoring system and detection systems communicate though a voice trunk (An exemplary PSTN communications network is further described below in FIG. 2.). A detection system using the timed off-hook or tone response methods can only report the presence or absence of service. The system cannot provide advanced reporting information such as the time of the last outage.

Figure 2:
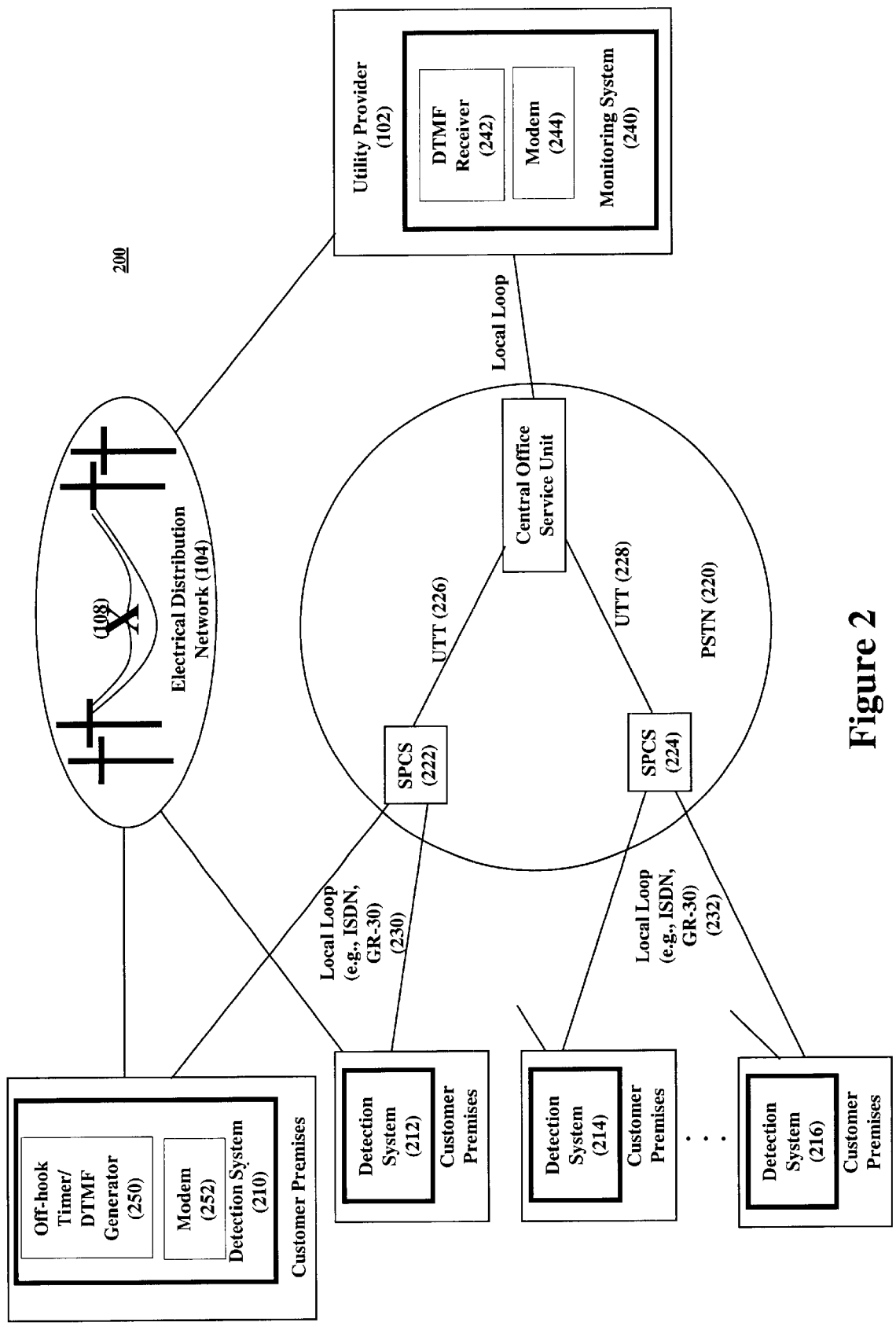
FIG. 2 depicts a further illustrative embodiment of our invention where the detection systems and monitoring system communicate through the PSTN using the Utility Telemetry System.

In particular, using the timed off-hook response method, as depicted in FIG. 2, a detection system acknowledges the presence of service or negatively acknowledges the absence of service by sending a timed off-hook in response to the query. Specifically, a 2-second off-hook time can acknowledge the presence of service and a 500-millisecond off-hook time can acknowledge the absence of service. In either case, a PSTN switching system detects the off-hook condition and duration and reports the condition to the monitoring system. In this case, the detection system must further comprise a device 250, as shown in FIG. 2, to control an off-hook duration. Such a device is known in the art.

Using the tone response method, a detection system responds to a query by acknowledging the presence of service or negatively acknowledging the absence of service by sending a DTMF signal, as defined in Telcordia Technologies "SR-3004—Testing Guidelines For Analog Type 1, 2, and 3 CPE as Described in SR-INS-002726". Specifically, under this method, the detection system goes off-hook, immediately transmits a DTMF "A" to acknowledge the presence of service or a DTMF "D" to acknowledge the absence of service, and then returns to on-hook (Note that the tone response method requires that the detection system have a DTMF generator 250 and the monitoring system have a DTMF receiver 242 to detect the DTMF signal, as shown in FIG. 2.). The detection system should transmit the DTMF signal for 2-seconds (contrary to SR-3004), which is long enough to allow for the off-hook and DTMF signal to propagate through the loop carrier and switching system, for the switch line card to stabilize, and for the monitoring system to attach the DTMF receiver 242 and recognize the signal. Note that 2-seconds ensures successful recognition of the acknowledgement over most connections; however, for many connections, the monitoring system will recognize the signal, record the service status, and disconnect the connection before the 2-seconds has expired.

Using the protocol message method, a detection system responds to a query by sending a message comprising at least one parameter, service status. This parameter indicates the presence or absence of the queried service. Unlike the timed off-hook and tone response methods, the protocol message method may also include optional parameters to support advanced detection systems that can report, for example, power voltage levels, prior outages, etc.

Turning to the configuration message, as discussed above, the detection systems can automatically report the status of utility service without being queried by the monitoring system. The configuration message is used by the monitoring system to configure the detection systems to operate in this automatic mode. The configuration message comprises two primary parameters including the monitoring system's address on the communications network and the reporting method. The network address is required for the detection system to establish contact with the monitoring system and send the service status. The reporting method indicates whether the detection system should report the status when a failure occurs and/or should report the status on a specified periodic basis. Optionally, the monitoring system can also configure a detection system to report advanced information, such as voltage levels, etc.

The status message is generated by the detection system to automatically report the service status as specified in the configuration message. The status message comprises at least one parameter, service status, which indicates the current presence or absence of service. The message may also include optional parameters to support advanced detection systems that can report power voltage levels, prior outages, etc. The detection system addresses the message based on the monitoring systems network address as specified in the configuration message.

Lastly, the alerting message is generated by the monitoring system to alert customers as to utility status by displaying a LCD message such as, for example, the estimated time until power is restored or a potential power outage. This message comprises at least one parameter, a message code parameter or a message text parameter. The message code parameter contains a message code that triggers the detection system to display a predefined message stored within the detection system. The message text parameter contains a text message defined by the monitoring system user. Optionally, the message can include the time and date of the alerting message and a callback number at which the customer can contact the utility provider. In addition, the alerting message can also include an alarm parameter that indicates whether the audible alarm 144 should be sounded and/or the LED 142 should be lit.

Reference will now be made to three specific communication networks over which our invention can be implemented. Again, the exact form of the communications network is not critical to our invention and one skilled in the art can readily implement our invention over different networks. FIG. 2 shows a first embodiment where the monitoring system communicates with the detection systems through PSTN 220, specifically, using the Utility Telemetry System (UTS). Here, PSTN addresses are assigned to the monitoring system and detection systems, which addresses are used to identify the systems and to establish connections. Under UTS, the monitoring system uses utility telemetry trunks (UTT) 226–228 to establish connections to stored program control switching systems (SPCS) 222–224 that serve the detection systems 210–216. Preferably, although not required, the SPCS's establish connections over the local loop 230–232 to the detection systems without using power-ringing (i.e., suppressed power ringing). The local loop connection can be digital, using for example non-call associated ISDN, or analog, using for example the voiceband data transmission interface as defined in Telcordia Technologies "GR-30-CORE—LSSGR: Voiceband Data Transmission Interface (FSD 05-01-0100)."

Using GR-30-CORE as a specific example, the monitoring application sends the query, configuration, and alerting messages to the SPCS's, which in turn transport the message to the detection systems using, for example, the Generic Data Message Frame Format as defined in GR-30-CORE. The detection systems can respond to a query message using either the timed off-hook or tone response method as described above. If the monitoring and detection systems can support, for example, modem communications over the UTT, a modem 252 and 244 can be incorporated into the detection systems and monitoring system, as shown in FIG. 2, and a protocol message can also be used to respond to the query message. Because it is not practical for an UTS system to allow CPE type equipment to originate connections, a detection system must establish, as an example, a separate modem connection to the monitoring system to send automatic status messages.

Figure 3:
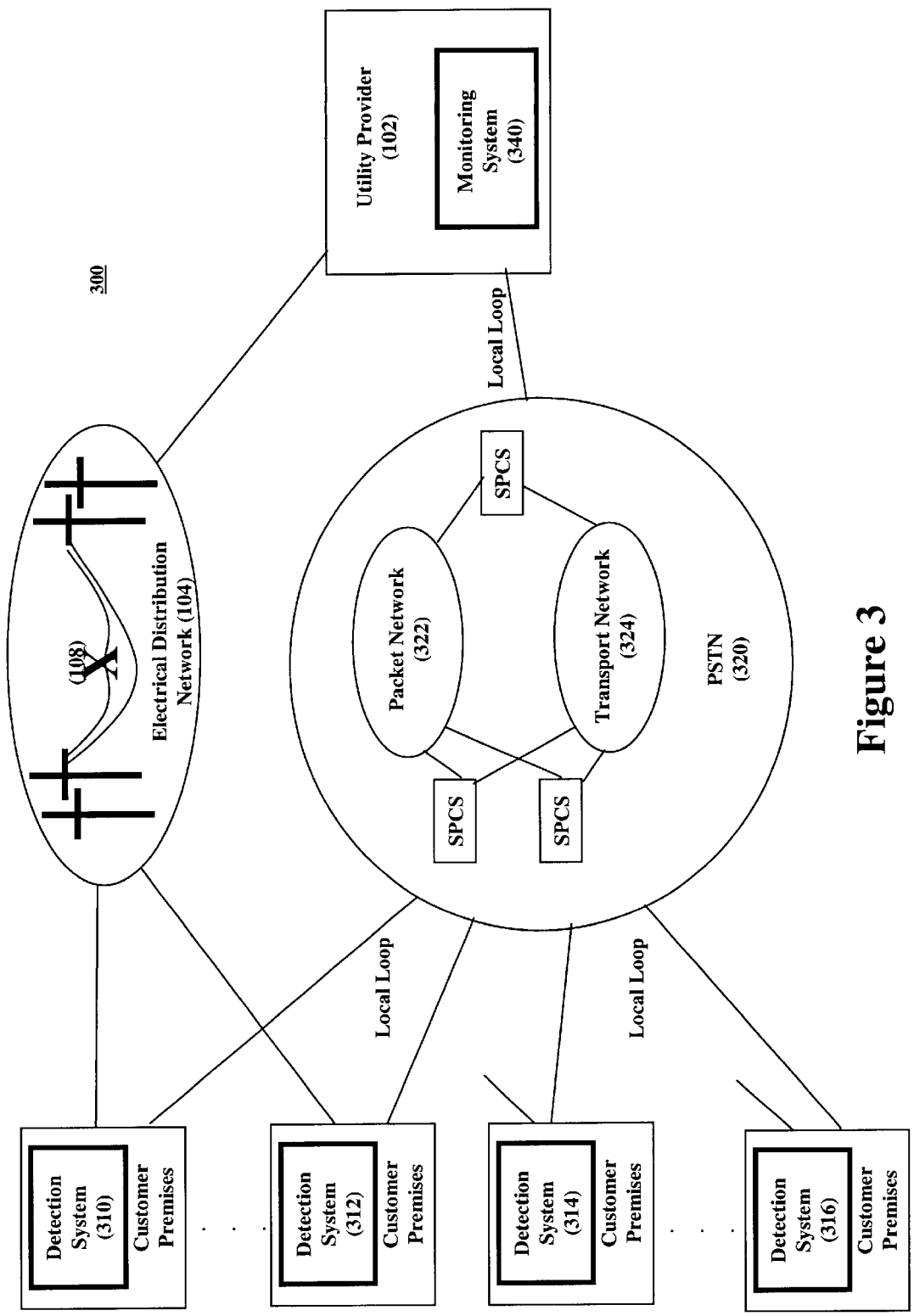
FIG. 3 depicts another illustrative embodiment of our invention where the detection systems and monitoring system communicate through the PSTN using a packet network, such as the CCS/SS7 network, and possibly the transport network.

FIG. 3 shows a second embodiment where the monitoring system communicates with the detection systems through PSTN 320 as described in U.S. patent application Ser. No. 09/626,437 by Stanley Pietrowicz, filed Jul. 27, 2000. Under this communications method, a packet network 322, such as the CCS/SS7 signaling network, is used to convey the query, response, alerting, configuration, and status messages between the monitoring system 340 and detection systems 310–316. Similarly, the detection systems can establish, as an example, a separate modem connection through the transport network 324 to the monitoring system in order to send the status and response messages.

Figure 4:
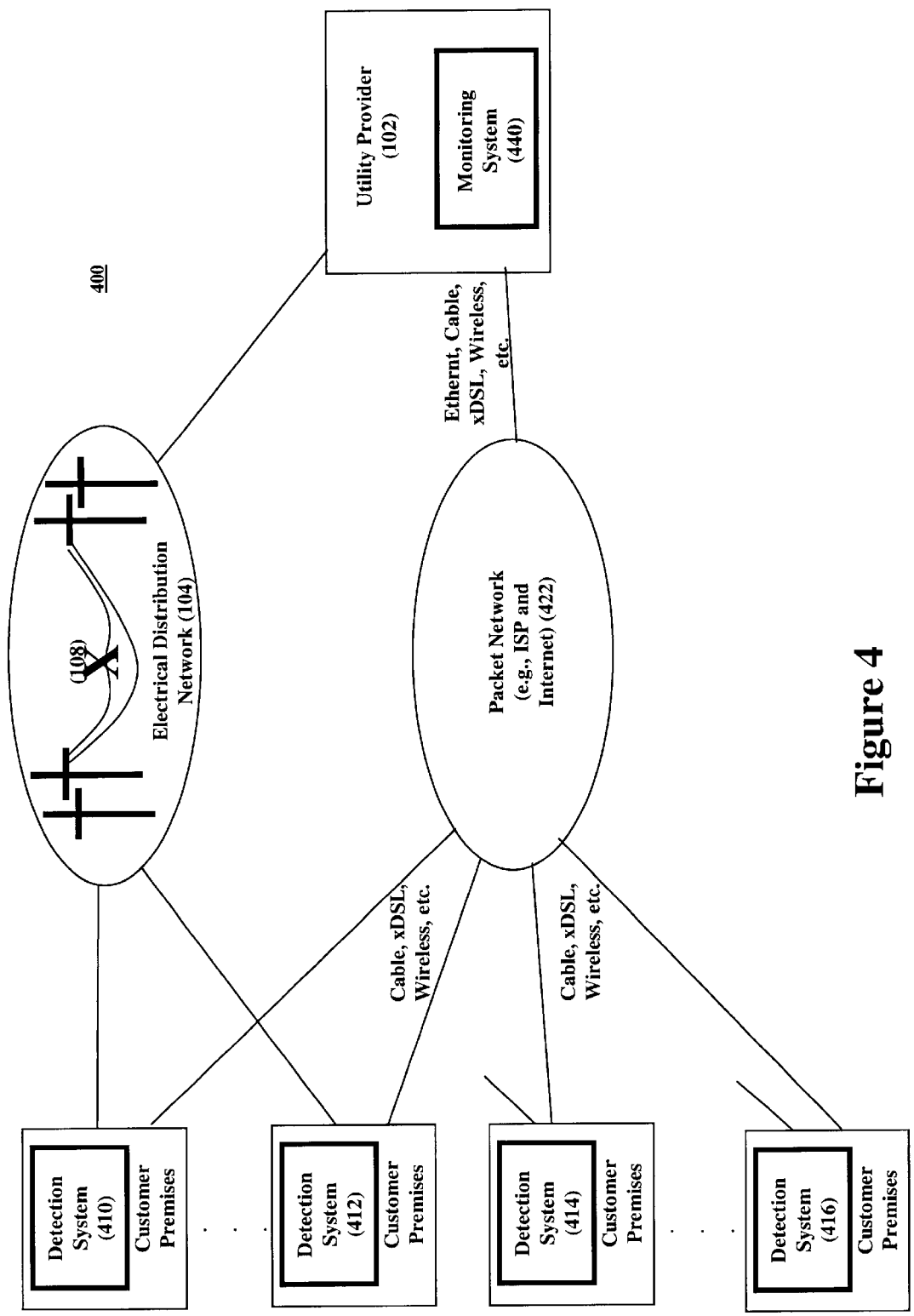
FIG. 4 depicts a still further illustrative embodiment of our invention where the detection systems and monitoring system communicate through a packet network, such as the Internet.

FIG. 4 shows a third embodiment where the monitoring system 440 communicates with the detection systems 410–416 through a packet network 422, such as that provided by an Internet service provider (ISP) and the Internet. Under this embodiment, the detection systems must have an "always-on" connection to the packet network, such as is provided by cable modem and xDSL modem access. Here, IP addresses can be assigned to the monitoring and detection systems, which addresses are used to identify the systems and to establish communications. All messages, for example, can be transmitted through the UDP protocol.

Although described with respect to electric utility providers, our invention is readily applicable to other applications. For example, if the communications network is other than the PSTN, the detection systems can monitor the presence/absence of telephony service and assist telephony service providers in detecting and locating telephony outages. Similarly, the system can monitor the presence/absence of cable service and thereby assist cable providers, etc.

The above-described embodiments of our invention are intended to be illustrative only. Numerous other embodiments may be devised by those skilled in the art without departing from the spirit and scope of our invention.

We claim:

1. A system for identifying an electrical service failure in an electrical distribution network that serves a plurality of customer premises, said system comprising:
   an electrical detection subsystem at each of the plurality of customer premises, wherein said subsystem is located within a customer premise device that comprises a PSTN (public switched telephone network) interface and an electrical outlet interface for interfacing the electrical distribution network,
   a monitoring system comprising:
   means for initiating suppressed power ringing connections through a PSTN to the customer premise devices and for sending query messages through the connections to said electrical detection subsystems therein, and
   a geographical database for correlating a geographical location of each of the customer premises with a geographical location of equipment within the electrical distribution network,
   means, within said detection subsystem and responsive to a received query message, for monitoring the outlet interface in order to determine the presence or absence of electrical service at the premises and means for reporting the determined service over the PSTN to the monitoring system, and
   means, within said monitoring system and responsive to the reported service and in combination with said geographical database, for identifying the electrical service failure in the distribution network.

2. The system of claim 1 wherein the monitoring system further comprises means, in combination with said geographical database, for determining the location and cause of the electrical service failure.

3. The system of claim 1 wherein
   the customer premise device further comprises means for conveying a message to a corresponding customer, and
   wherein said monitoring system further comprises means for sending messages to the electrical detection subsystems and message conveying means.

4. The system of claim 1 wherein the reporting means of the detection subsystem is means for transmitting DTMF signals over the PSTN wherein a first DTMF signal indicates the presence of electrical service and a second DTMF signal indicates the absence of electrical service.

5. The system of claim 4 wherein the reporting means transmits the DTMF signals for 2 seconds.

6. The system of claim 1 wherein the reporting means of the detection subsystem is means for controlling an off-hook duration wherein first and second off-hook durations indicate the presence and the absence of electrical service.

7. The system of claim 6 wherein the first off-hook duration is 2 seconds and the second off-hook duration is 500 milliseconds.

8. The system of claim 1 wherein the customer premise device is a caller identification box.

9. An electrical detection system for reporting the presence or absence of electrical service at a customer premise serviced by an electrical distribution network, the reported service intended to be used by a monitoring system comprising a geographical database for correlating geographical locations of customer premises with geographical locations of equipment within the electrical distribution network and further comprising means responsive to the reported service and in combination with the geographical database, for identifying an electrical service failure in the distribution network, said electrical detection system comprising:
   a PSTN interface,
   an electrical outlet interface intended for interfacing the electrical distribution network at the customer premise,
   means for monitoring the outlet interface in order to determine the presence or absence of electrical service at the customer premise, and
   means for reporting the determined electrical service to the monitoring system via a PSTN suppressed power ringing connection intended to be established by the monitoring system.

10. The system of claim 9 wherein the reporting means is means for transmitting DTMF signals over the PSTN wherein a first DTMF signal indicates the presence of electrical service and a second DTMF signal indicates the absence of electrical service.

11. The system of claim 10 wherein the reporting means transmits the DTMF signals for 2 seconds.

12. The system of claim 9 wherein the reporting means is means for controlling an off-hook duration wherein first and second off-hook durations indicate the presence and the absence of electrical service.

13. The system of claim 12 wherein the first off-hook duration is 2 seconds and the second off-hook duration is 500 milliseconds.

14. A method for identifying an electrical service failure in an electrical distribution network that serves a plurality of customer premises, said method comprising:

initiating suppressed power ringing connections from a monitoring system through a PSTN to a plurality of electrical detection subsystems at customer premises, wherein the electrical detection subsystems comprise an electrical outlet interface for interfacing the electrical distribution network, sending query messages from the monitoring system through the connections to the electrical detection subsystems, monitoring at the electrical detection subsystems, in response to a received query message, the outlet interface in order to determine the presence or absence of electrical service at the premises, reporting the determined service from the electrical detection subsystems over the PSTN to the monitoring system, and identifying at the monitoring system, in response to the reported service and in combination with the geographical database, the electrical service failure in the distribution network.

15. The method of claim 14 wherein the reporting step comprises each electrical subsystem transmitting a DTMF signal over the PSTN wherein a first DTMF signal indicates the presence of electrical service and a second DTMF signal indicates the absence of electrical service.

16. The method of claim 15, wherein each electrical subsystem transmits the DTMF signal for 2 seconds.

17. The method of claim 14 wherein the reporting step comprises each electrical subsystem controlling an off-hook duration wherein first and second off-hook durations indicate the presence and the absence of electrical service.

18. The method of claim 17 wherein each electrical subsystem controls the first off-hook duration for 2 seconds and the second off-hook duration for 500 milliseconds.

* * * * *